United States Patent [19]
Stuart et al.

[11] 3,729,084
[45] Apr. 24, 1973

[54] BRICK STOPPING AND GROUPING APPARATUS

[75] Inventors: Gerald L. Stuart; John J. Brown, Jr., both of Siler City, N.C.

[73] Assignee: Forrest Paschal Machinery Company, Siler City, N.C.

[22] Filed: Mar. 22, 1971

[21] Appl. No.: 126,673

[52] U.S. Cl. ............................. 198/21, 198/31 AA
[51] Int. Cl. .................................... B65g 47/32
[58] Field of Search .................. 198/21, 24, 31 AA, 198/31 AB; 214/6 A

[56] References Cited

UNITED STATES PATENTS

| 2,881,898 | 4/1959 | Reilly | 198/31 AB |
| 3,262,542 | 7/1966 | McClelland | 198/24 X |
| 3,525,097 | 8/1970 | Maulini | 198/24 |

Primary Examiner—Evon C. Blunk
Assistant Examiner—W. Scott Carson
Attorney—Hunt, Heard & Rhodes

[57] ABSTRACT

Retractive movement of the brick engaging member is controlled by a plurality of piston and cylinder assemblies connected in tandem thereto and displaceable therewith when desired to an inoperative position.

5 Claims, 5 Drawing Figures

Patented April 24, 1973 3,729,084

INVENTORS
GERALD L. STUART
JOHN J. BROWN JR.
BY
Hunt, Heard & Rhodes

BRICK STOPPING AND GROUPING APPARATUS

BACKGROUND OF THE INVENTION

This invention relates to brick handling apparatus, and more particularly to an improved apparatus for stopping and grouping bricks being rapidly conveyed in a row formation along a predetermined path of travel, as during the course of their manufacture.

At various times during the process of their manufacture, it is necessary to arrange bricks being conveyed in row formation along a predetermined path of travel into momentarily-stationary discrete groups of a desired uniform size. For instance the raw bricks conducted from an extruder or other forming apparatus along a so-called "off-bearing" conveyor belt preferably are removed from that belt in uniform groupings of predetermined desired size in preparation for their eventual automatic stacking upon kiln cars or the like.

U. S. Pat. No. 3,525,097 discloses an apparatus for handling "biscuit-like" articles being conveyed along a predetermined path of travel, which apparatus includes retractable stop means extending across such path, article gripping means disposed on opposite sides thereof upstream from the stop means, and pusher means and a receiving platform or conveyor located on opposite sides of the articles' path of travel intermediate the stop means and the gripping means. It has heretofore been attempted to use, for brick handling purposes, apparatus generally of the aforesaid type and employing a single pneumatic piston and cylinder assembly for controlling movement of the stop means. Such attempts have not proved entirely successful.

In contrast to the "biscuit-like" articles of the aforesaid patent, bricks possess considerable mass, and are in modern-day brick-handling operations conveyed at a very high rate of speed. Additionally, when the bricks are in their unfired or raw state, they may rather easily be crushed or otherwise deformed and thereby rendered unusable. These factors, in conjunction with the need for maintaining a high production rate, impose conflicting demands upon a brick stopping and grouping apparatus. The advancing row of bricks must be decelerated at a controlled rate and/or under controlled force conditions, which apparently is not necessary or possible in the case of the apparatus of U.S. Pat. No. 3,525,097, and at the same time the various components of the apparatus must operate both quite rapidly and in proper precise synchronization with one another. The aforesaid results have not reliably ensued when it has been attempted to control movement of the stop means by a single piston and cylinder assembly, connected via suitable limit switches, relays and the like to the remaining components of the apparatus. Among the problems encountered are the realization of groupings of improper size, deformation of the bricks and/or unsynchronized operation of the components of the apparatus.

SUMMARY OF THE INVENTION

With the foregoing in mind, the present invention provides an improved brick-stopping and grouping apparatus which is highly efficient and rapid in operation while of relatively inexpensive, durable and reliable construction. The apparatus is so designed and constructed as to, during each cycle of operation, decelerate the advancing row of bricks at a controlled rate and/or under controlled force conditions, such that crushing or other deformation of even unfired raw bricks does not occur, and to then cause rapid positive retraction of the stop means, together with synchronized operation of other components of the apparatus, when and only when a brick-grouping of the desired size has accumulated against the stop means.

In a preferred form of the invention, the apparatus is also capable of being readily adjusted to accommodate bricks and/or brick-groupings of various sizes, and is further capable of being readily moved to and from operative and inoperative positions when desired with speed and facility. Such features enhance the versatility of the apparatus and permit its beneficial utilization in a number of brick-handling operations.

In a preferred embodiment of the apparatus, the movement of the stop means is controlled by at least a pair of interconnected piston and cylinder assemblies, which preferably are of a conventional and low-cost pneumatic type. The assemblies are maintained under desired differential pressures, and are interconnected in tandem such that one of them so controls movement of the stop means, under the impetus of its engagement with the leading brick of the advancing row and from a fully extended and to a first retracted position, as to insure that the generated forces remain insufficient to damage the bricks in any way. The reaching by the aforesaid assembly of the end of its effective stroke reliably signifies that a brick-grouping of the desired size has accumulated against the stop means, and is utilized to actuate other components in desired timed sequence. This in turn causes the other piston and cylinder assembly, heretofore inactive since under a higher pressure, to rapidly move the stop means from its first and to a second retracted position, which in turn permits separation of the previously-accumulated group of bricks from the remaining bricks of the row, the advancement of which has been temporarily halted by conventional gripping means. The reaching of the second assembly of the end of its effective stroke causes actuation of pusher means which displaces the accumulated and separated group of bricks laterally from its prior path of travel, after which the two piston and cylinder assemblies and the remaining components of the apparatus are rapidly and automatically restored to their original conditions in readiness for another cycle of operation.

To accommodate bricks and/or groupings of varying size, the stop means, the two piston and cylinder assemblies and certain limit switches associated therewith are readily adjustable as a unit longitudinally of the path of travel of the bricks. Also in the preferred form of the invention, the aforesaid components and an associated frame structure therefor are mounted for convenient movement when desired between their normal operative position, wherein the same are disposed within the path of travel of the bricks, and an inoperative position spaced from such path of travel. Movement of the aforesaid components between their operative and inoperative positions may be accomplished with such facility as to permit, for instance, a "run" of defective bricks to be by-passed by the present apparatus without shutting down the overall brick-handling operation.

DESCRIPTION OF THE DRAWINGS

The foregoing and other benefits and advantages of the invention will be in part apparent and in part pointed out hereinafter in the following description of an illustrative embodiment, which should be read in conjunction with the accompanying drawings, in which.

DESCRIPTION OF THE PREFERRED EMBODIMENT

Figure 1:
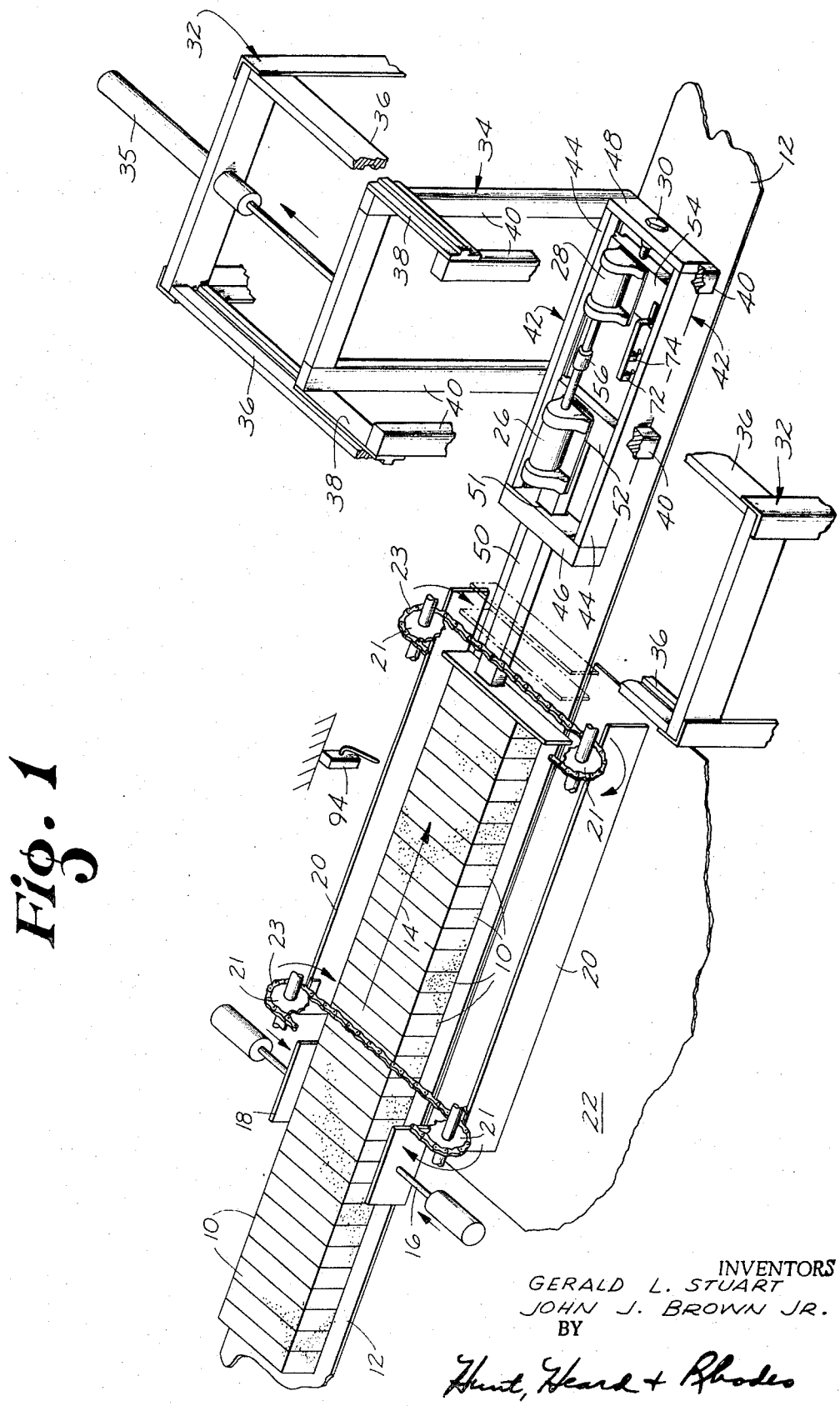
FIG. 1 is an environmental, fragmentary and partially-schematic perspective view of brick stopping and grouping apparatus embodying the invention, some of the components being partially broken away to better reveal details of construction.

In FIG. 1 the numeral 10 designates a row of bricks supported upon and being rapidly advanced by a continuously driven belt conveyor 12 in the direction and along the longitudinal path of travel indicated by the arrow 14. Mounted adjacent conveyor 12, in an order extending from left to right or from upstream to downstream thereof, are brick gripping means including pneumatically operated gripping devices 16, 18; brick pusher means in the form of a series of elongate and evenly spaced pusher blades 20 (only two of which are shown) supported at their opposite ends by endless chains 21 entrained about suitable sprockets 23; brick receiving means in the form of a platform (or conveyor) 22; and brick stopping and grouping means including a brick engaging plate member 24. Gripping devices 16, 18 may be constructed and mounted, on opposite sides of conveyor 12, in any suitable manner such that upon actuation the same extend toward one another and so grip the bricks 10 then disposed therebetween as to halt the advancement of such bricks, and others disposed upstream therefrom and coming into engagement therewith, by conveyor 12. The pusher means may similarly be mounted and constructed in any suitable manner such that, upon actuation thereof, the one of its elongate pusher blades 20 then positioned on the far side of conveyor 12 (as viewed in FIG. 1) will move whatever group of bricks 10 is at that time adjacent thereto laterally from conveyor 12 and onto the platform 22 disposed on the opposite side of conveyor 12. Although the present apparatus is not limited to only such a utilization, conveyor 12 might be the so-called "off-bearing" belt utilized to coney raw or unfired bricks from an extruder or other forming apparatus to a location adjacent the kiln cars or the like upon which the bricks would be stacked for firing. In that event, platform 22 might and normally would comprise a table or conveyor leading to an automatic brick everting and/or stacking mechanism.

The improved brick stopping and grouping apparatus of the present invention generally comprises, in addition to brick engaging plate member 24, first means including pneumatic piston and cylinder assembly 26 operatively connected to plate member 24 for exerting thereon a retarding force of substantially constant desired magnitude yieldingly opposing retractive movement of member 24 from an initial position (shown in solid lines in FIG. 1) and to a first retracted position (shown in the leftward phantom lines); second means including another pneumatic piston and cylinder assembly 28, which is operatively connected to assembly 26 and through it to plate member 24, for controlling movement of member 24 from its first and to a second retracted position (shown in the rightward phantom lines in FIG. 1); means including a screw member 30 for readily adjusting as desired the position of the aforesaid and certain related components as a unit longitudinally of conveyor 12 for the purpose of accommodating bricks and/or brick groupings of varying size; frame means including an upright stationary main frame 32 and a depending subframe 34; and means in the form of a pneumatic piston and cylinder assembly 35 for rapidly moving frame 34 relative to frame 32 and conveyor 12 when desired.

Stationary main frame 32 straddles conveyor 12 and its uppermost section includes parallel track-like members 36 which extend horizontally above and at right angles to conveyor 12. Mating slide-blocks 38 provided atop subframe 34 connect the subframe, which includes depending members 40 and a lower section 42, to members 36 of main frame 32 for movement longitudinally thereof. The length of members 40 is such that lower section 42 of subframe 34 is disposed at an elevation only slightly above that of the upper surface of conveyor 12. Piston and cylinder assembly 35 has its rod and cylinder components respectively connected to upper sections of subframe 34 and main frame 32 such that upon retraction thereof (under the impetus of suitable controls subsequently described) assembly 35 rapidly moves subframe 34 from its normal operative position, shown in FIG. 1 and wherein lower frame section 42 extends longitudinally above the center of conveyor 12, to an inoperative position wherein subframe 34 is disposed entirely to one side of conveyor 12.

Lower section 42 of subframe 34 is of generally rectangular shape, including spaced pairs of elongate track-like members 44 and interconnecting front and rear end members 46, 48, respectively. Brick-engaging plate member 24 is mounted substantially vertically at one end of a reciprocatorily-movable plunger member 50 which extends through a guide opening 51 provided within front end 46 of lower frame section 42. Mounted upon or formed integrally with that opposite end of plunger 50 disposed within frame section 42 is a slide block 52 matingly engaging and movable longitudinally of track-like members 44. A second slide block 54 is similarly mounted by track-like members 44 between block 52 and rear end member 48 of frame section 42. Screw 30 projects through rear end member 48 of frame section 42 and into an elongate threaded bore provided within the adjacent slide block 54, such that by merely rotating screw 30 the position of block 54 longitudinally of frame section 42 may be readily adjusted in either direction. A pair of longitudinally-spaced limit switches 72, 74 are mounted upon slide block 54 in any suitable manner, for adjustive movement therewith and for sequential actuation by any convenient part of slide block 52 at desired times, as discussed more fully hereinafter.

Figure 2:
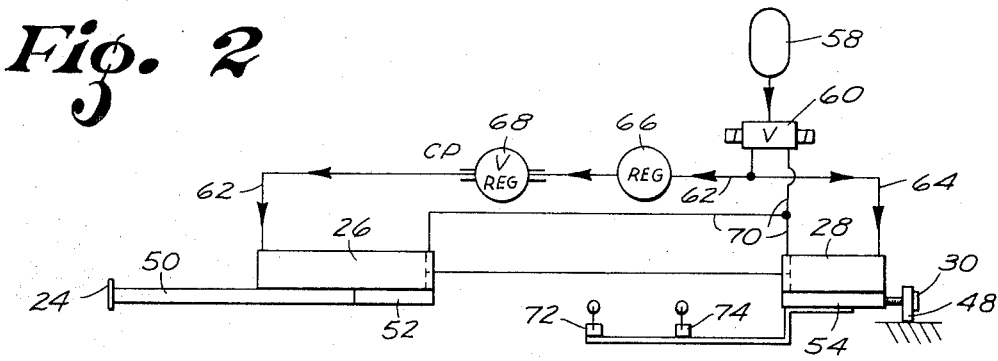
FIGS. 2-4 are diagrammatic, sequential side-elevational views of the stop means and piston and cylinder assemblies shown in the lower right-hand part of FIG. 1, and of portions of the control circuitry therefor, illustrating the operation thereof.
Figure 3:
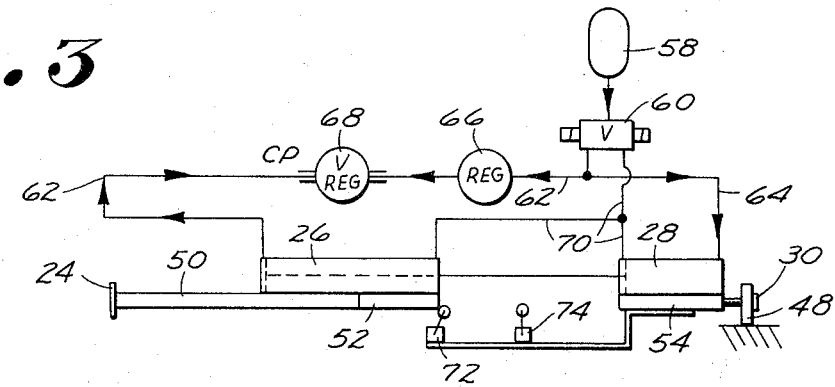
Figure 4:
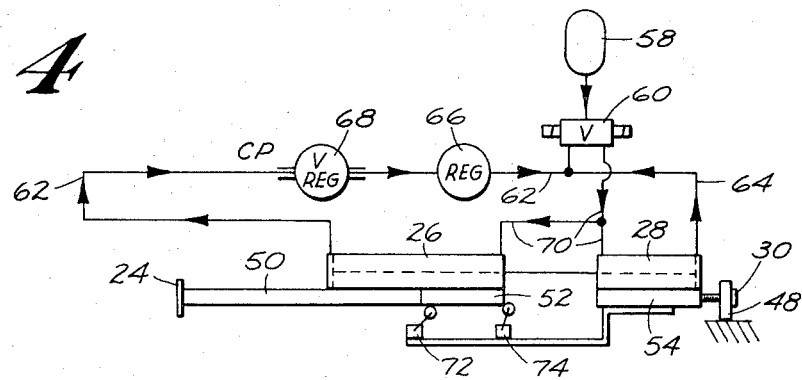

Referring now also to FIGS. 2–4, the cylinder components of assemblies 26, 28 are respectively mounted in axial alignment with one another upon the corresponding slide blocks 52, 54. The rod components of assemblies 26, 28, which in the preferred embodiment have effective strokes of approximately 4 inches and 2 inches respectively, project toward one another and are fixedly joined together by a suitable coupling 56 (FIG. 1).

Referring now particularly to FIGS. 2–4, suitably filtered and lubricated air at a regulated line pressure of, for example, approximately 40 psi is conducted from a conventional source 58 to the inlet of a solenoid-operated valve 60 having a pair of alternatively-employed outlets. One of such valve outlets is connected by flexible conduits 62, 64 to the respective outer ends of corresponding ones of the cylinder components of assemblies 26, 28. The air directed from valve 60 through conduit 64 is delivered to assembly 28 at line pressure, illustratively 40 psi. The air directed from valve 60 through conduit 62 is reduced, by an adjustable regulator 66 provided within conduit 62, to a significantly lower pressure, illustratively 20 psi. A second regulator 68 of the rapid-exhaust type, which is provided within conduit 62 intermediate regulator 66 and assembly 26, insures that the pressure within the assembly's outer end never appreciably exceeds the aforesaid preselected value, illustratively 20 psi. The second outlet of valve 60 is connected by suitable flexible conduits 70 to the confronting inner ends of the cylinders of assemblies 26, 28. When air is directed fro solenoid valve 60 through conduits 70, which occurs upon energization of valve 60, such air is delivered to assemblies 26, 28 at line pressure, 40 psi.

Figure 5:
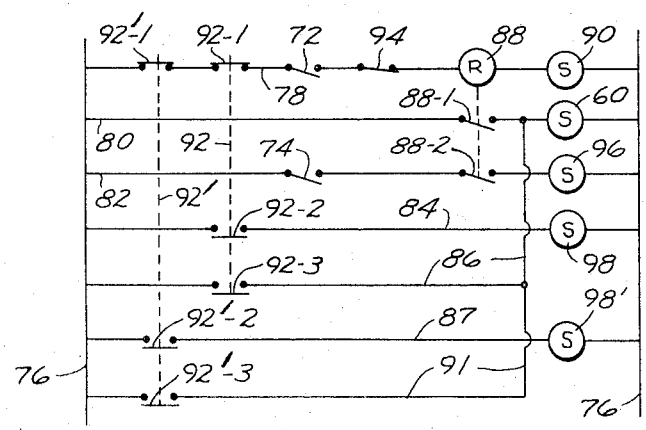
FIG. 5 is a diagrammatic representation of the electrical circuitry of the apparatus.

Suitable electrical control circuitry for the apparatus, shown in FIG. 5, includes main lines 76 and branch 78, 80, 82, 84, 86, 87 and 91. Line 78 includes normally-open limit switch 72, an adjustable time-delay relay 88, a solenoid valve 90 effective when energized to actuate the single-acting gripping devices 16, 18 (FIG. 1), the normally-closed contacts 92-1 and 92'-1 of two manually operable switches 92, 92' operatively associated with double-acting piston and cylinder assembly 35 (FIG. 1), and a normally-closed limit switch 94 which is so mounted adjacent the pusher means of the apparatus as to be engaged and momentarily opened by one of the pusher blades 20 upon the completion of each cycle of pusher operation (see also FIG. 1). Line 80 includes a first normally-open contact 88-1 of relay 88, and also includes solenoid valve 60. Line 82 includes normally-open limit switch 74, a second normally-open contact 88-2 of relay 88, and a solenoid valve 96 effective when energized to actuate a hydraulic motor or the like (not shown) operatively connected to one of the sprockets 23 for chains 21 (FIG. 1) and effective when actuated to cause chains 21 to be driven in a clockwise direction (as viewed in FIG. 1). Line 84 includes a normally-open contact 92-2 of manually operable switch 92, and also includes a solenoid valve 98 effective when energized to cause retraction of piston and cylinder assembly 35 (FIG. 1). Line 87 similarly includes a normally-open contact 92'-2 of manually operable switch 92', and a solenoid valve 98' effective when energized to cause return movement of assembly 35 back to its FIG. 1 position. Lines 86, 91 each interconnect branch line 80, being connected thereto at a location intermediate relay contact 88-1 and solenoid valve 60, and one of the main lines 76 of the circuit, and respectively include another normally-open contact 92-3, 92'-3 of manually operable switches 92, 92'.

OPERATION

The positions occupied by the various components of the apparatus at the outset of a cycle of operation are shown in FIGS. 1 (solid lines), 2 and 5. The air then directed by valve 60 through conduits 62, 64 causes both assemblies 26, 28 to be fully extended, which in turn causes plate member 24 to occupy its fully-extended position shown in solid lines in FIGS. 1 and 2. Gripping devices 16, 18 and all pusher blades 20 (FIG. 1) are at this time all spaced from bricks 10. Conveyor 12 is rapidly advancing the row of bricks 10 in the direction of the arrow 14.

In FIG. 3 plate member 24 has been moved, under the impetus of its engagement with the advancing row of bricks 10, from its fully extended position and to its first retracted position, a distance equal to the effective 4 inch stroke of assembly 26, the telescoping or retraction of which permitted such movement of plate member 24. The 20 psi or other pressure maintained constant within assembly 26 at this time is so selected as to cause assembly 26 and plate member 24 to gradually decelerate the row of bricks 10, with ensuing slippage between them and the still-advancing conveyor 12, and to cause assembly 26 to reach the end of its effective stroke when and only when a grouping of the desired number of bricks 10 has accumulated between plate 24 and gripping devices 16, 18. Further, the substantially constant pressure within assembly 26 insures that the magnitude of the forces to which bricks 10 are subjected during their accumulation remains insufficient to damage or deform the same. It will be appreciated in the latter regard that if the pressure within assembly 26 were allowed to sharply increase, as would happen but for the presence of regulator 68 within conduit 26, deformation of particularly raw or unfired bricks might readily occur. Such bricks similarly might be readily deformed if the rate of their advancement were decelerated too abruptly.

The time required for movement of plate member 24 from its fully extended and to its first retracted position will vary depending upon the spacing, which might in some operations be quite uneven, between individual ones of the row of bricks 10. However, when plate 24 does reach its first retracted position, any such spacings will have been eliminated from the desired grouping of bricks 10 then accumulated between plate 24 and gripping devices 16, 18. At this point, as is also indicated in FIG. 3, slide block 52 closes limit switch 72. This in turn energizes solenoid valve 90 (FIG. 5) which immediately actuates devices 16, 18 (FIG. 1) and causes the same to firmly grip the bricks 10 then therebetween. The tripping of limit switch 72 also energizes time-delay relay 88 (FIG. 5), which is of the "on" delay type.

During all of the aforesaid time, no movement has occurred in connection with assembly 28 due to the higher pressure, illustratively 40 psi, maintained therewithin.

The timing-out after a very brief interval of relay 88 causes its contacts 88-1 and 88-2 (FIG. 5) to close. The closure of contact 88-1 energizes solenoid valve 60 which, as is shown in FIG. 4, now directs its outlet air through conduits 70, rather than through conduits 62, 64 as previously. The air directed through conduits 70 to assembly 26 secures or "locks" its already fully retracted components in their relative positions, while that directed to assembly 28 causes retraction thereof to the limit of its effective stroke, approximately 2 inches. This in turn causes simultaneous and equidistant movement of plate member 24 from its first retracted position and to its second retracted position, wherein the same just clears the path of movement of pusher blade 20 (FIG. 1), and also causes the second limit switch 74 upon slide block 54 to be closed by slide block 52.

The aforesaid movement of plate member 24 to its second retracted position allows the accumulated group of bricks 10 to advance with plate 24 and thus become spaced slightly from the upstream bricks still maintained stationary by gripping devices 16, 18. The closing of limit switch 74 energizes solenoid valve 96 (FIG. 5), which causes the pusher blade 20 shown in FIG. 1 on the far side of conveyor 12 to advance to the near side thereof, such that the discrete group of bricks 10 then disposed forwardly of such blade is moved laterally from conveyor 12 and onto platform 22. Once this has been accomplished, the next blade 20 (not shown) engages and momentarily opens limit switch 94 (FIGS. 1 and 5). This immediately deenergizes relay 88 and solenoid valves 90, 60 and 96 (the latter by the ensuing opening of relay contacts 88-1 and 88-2, respectively). The foregoing simultaneously causes deactuation of the pusher means and gripping devices 16, 18, and at the same time causes valve 60 to again direct its outlet air through conduits 62, 64. Such air immediately restores assemblies 26, 28 to their original conditions shown in FIGS. 1 and 2, and thereby causes return movement of plate member 24 to its fully extended position. Limit switches 72, 74 again open as slide block 52 passes out of engagement therewith. All components of the apparatus are therefore then in readiness for another cycle of operation in conjunction with the again-advancing row of bricks 10 upon conveyor 12.

The apparatus may be readily adjusted, within a significant range and to accommodate bricks and/or brick groupings of varying sizes, by rotating screw 30 in an appropriate direction and to a desired extent. It will be noted that such rotation moves slide blocks 52, 54, assemblies 26, 28, plate member 24 and limit switches 72, 74 simultaneously as a unit, without changing the relative distances between any of such components. In conjunction with the foregoing adjustment, it may of course be necessary or desirable to also make other adjustments, such as in the pressure of the air delivered to one or both of assemblies 26, 28.

If a run of defective bricks 10 should appear upon conveyor 12, as might for instance occur if the extruder or other brick-forming apparatus should malfunction, an operator could, by actuation of piston and cylinder assembly 35, through manipulation of switch 92 and energization of solenoid valve 98 by closure of its contact 92-2 (FIG. 5), rapidly move subframe 32 and all of its associated components to an inoperative position laterally spaced from conveyor 12. After passage of the defective bricks 10, which might be collected at the end of the conveyor for recycling, the apparatus could similarly be rapidly restored to its operative condition by actuation of switch 92' and closure of its contact 92'-2, which energizes solenoid valve 98'. The additional contacts 92-1, 92-3, 92'-1, 92'-3 of switches 92, 92' prevent energization of solenoid valves 90, 96 while either valve 98, 98' is energized, and energize solenoid valve 60 concurrently therewith so that plate 24 is retracted clear of blades 20 prior to any appreciable lateral movement of subframe 42.

The word "brick" or "bricks," as used herein and in the following claims, is meant and should be construed to encompass not only conventional bricks, whether fired or unfired, but also other objects of comparable characteristics, such as blocks, tiles, uncut clay columns, etc.

Although a preferred embodiment of the invention has been specifically shown and described, it is to be understood that this was for purposes of illustration only, and not for purposes of limitation, the scope of the invention being in accordance with the following claims.

That which is claimed is:

1. An apparatus for stopping and grouping bricks being advanced longitudinally in a row along a predetermined path of travel comprising:
   a. a stop member mounted for engagement with a leading one of said bricks and for retractive movement along said path of travel between an initial position and first and second retracted positions;
   b. first means operatively connected to said stop member for exerting thereon a retarding force of a prescribed, substantially constant desired magnitude yieldingly opposing retractive movement of said member from its initial position to its first retracted position, said first means including a first pneumatic piston and cylinder assembly and a pneumatic circuit for said assembly including a pressure regulator of a rapid-exhaust type which insures that said retarding force does not exceed said prescribed desired magnitude;
   c. a second means operatively connected to said first means, and through said first means to said stop member, for moving said stop member from its first re-tracted position to its second retracted position in response to the movement of said stop member from said initial position to said first retracted position.

2. Apparatus as in claim 1, including frame means mounting said brick-engaging member for said retractive movement and for adjustive movement longitudinally of said path of travel, and means carried by said frame means for imparting said adjustive movement to said brick-engaging member.

3. Apparatus as in claim 1, including frame means mounting said brick-engaging member for movement from its operative position adjacent said path of travel to an inoperative position remote from said path of travel, and means carried by said frame means for moving said member from its operative and to its inoperative position.

4. Apparatus as in claim 1 wherein said second means includes a second pneumatic piston and cylinder assembly operatively connected in tandem to said first pneumatic piston and cylinder assembly for positively retracting said stop member from its first retracted position to its second retracted position, and wherein said pressure regulator maintains a lesser pressure within said first assembly than in said second assembly during retractive movement of said member from its initial position to its first retractive position.

5. Apparatus as in claim 4, wherein said assemblies are mounted in opposed axial alignment to each other, and including a coupling fixedly interconnecting the piston-rod components of said assemblies.

* * * * *